(12) United States Patent
Wille et al.

(10) Patent No.: US 9,137,677 B2
(45) Date of Patent: Sep. 15, 2015

(54) DEVICE AND METHOD FOR QOS BASED CELL CAPACITY DIMENSIONING

(75) Inventors: Volker Wille, St. Ives (GB); Phil Pickering, Willingham (GB); Simon Browne, Macclesfield (GB)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 2066 days.

(21) Appl. No.: 12/081,837

(22) Filed: Apr. 22, 2008

(65) Prior Publication Data
US 2008/0205290 A1    Aug. 28, 2008

Related U.S. Application Data

(62) Division of application No. 10/488,551, filed as application No. PCT/EP01/10361 on Sep. 7, 2001, now abandoned.

(51) Int. Cl.
    H04W 28/26     (2009.01)
    H04W 24/00     (2009.01)
    H04W 28/02     (2009.01)
    H04W 28/24     (2009.01)

(52) U.S. Cl.
    CPC .......... *H04W 24/00* (2013.01); *H04W 28/0289* (2013.01); *H04W 28/26* (2013.01); *H04W 28/24* (2013.01)

(58) Field of Classification Search
    USPC ......... 370/230, 235, 236, 252, 253, 254, 280, 370/337, 348, 349, 352, 401, 402, 420, 463, 370/310; 709/223–225, 233; 455/63.3, 447, 455/560; 375/140
    See application file for complete search history.

(56) References Cited

U.S. PATENT DOCUMENTS

| | | | | |
|---|---|---|---|---|
| 5,296,852 A | * | 3/1994 | Rathi | 340/933 |
| 5,729,534 A | * | 3/1998 | Jokinen et al. | 370/280 |
| 5,737,691 A | * | 4/1998 | Wang et al. | 455/63.3 |
| 5,748,629 A | * | 5/1998 | Caldara et al. | 370/389 |
| 5,859,840 A | | 1/1999 | Tiedemann, Jr. et al. | |
| 6,137,777 A | * | 10/2000 | Vaid et al. | 370/230 |
| 6,141,545 A | * | 10/2000 | Begeja et al. | 455/417 |
| 6,141,565 A | * | 10/2000 | Feuerstein et al. | 455/560 |
| 6,212,386 B1 | * | 4/2001 | Briere et al. | 455/447 |

(Continued)

FOREIGN PATENT DOCUMENTS

EP    0 831 669 A2    3/1998

OTHER PUBLICATIONS

Naghshineh, et al., "QOS Provisioning in Micro-Cellular Networks Supporting Multiple Classes of Traffic", Wireless Networks, ACM, vol. 2, No. 3, Aug. 1, 1996, pp. 195-203.

*Primary Examiner* — Andrew Lai
(74) *Attorney, Agent, or Firm* — Squire Patton Boggs (US) LLP

(57) ABSTRACT

The invention relates to a method and system for monitoring QoS criteria of Traffic classes of at least one cell in a telecommunication system, comprising means for setting thresholds, means for monitoring the traffic with regard to the thresholds for the at least two different traffic classes, and means for adapting the traffic handling capacity of the monitored cell depending on the monitoring result. The monitored traffic classes preferably include circuit-switched traffic and packet-switched traffic, and/or realtime and non-realtime packet-switched traffic. Thresholds are preferably set and monitored for rate of call attempt blocking, and/or data throughput, and/or service blocking.

24 Claims, 6 Drawing Sheets

FLOWCHART TO EVALUATE CAPACITY
UP/DOWNGRADES FOR A CELL

(56) References Cited

U.S. PATENT DOCUMENTS

| | | | |
|---|---|---|---|
| 6,324,184 B1 * | 11/2001 | Hou et al. | 370/468 |
| 6,381,250 B1 | 4/2002 | Jacobson et al. | |
| 6,385,451 B1 | 5/2002 | Kalliokulju et al. | |
| 6,446,123 B1 * | 9/2002 | Ballantine et al. | 709/224 |
| 6,480,524 B1 * | 11/2002 | Smith et al. | 375/140 |
| 6,480,542 B1 * | 11/2002 | Prange et al. | 375/240.15 |
| 6,553,006 B1 * | 4/2003 | Kalliokulju et al. | 370/310 |
| 2002/0103900 A1 * | 8/2002 | Cornelius et al. | 709/224 |

* cited by examiner

BASIC FLOWCHART FOR CELL CAPACITY DIMENSIONING
BASED ON QoS TARGETS

| TRAFFIC CLASS | TRAFFIC EXAMPLES | QoS CRITERIA | QoS REQUIREMENT EXAMPLES |
|---|---|---|---|
| CIRCUIT-SWITCHED | VOICE TRAFFIC | CALL ATTEMPT BLOCKING | E.G. 2% OF ALL CALL ATTEMPTS |
| NON-REALTIME PACKET-SWITCHED | FTP, E-MAIL DOWNLOAD, WEB-BROWSING | THROUGHPUT | E.G. 15 KBIT/SEC |
| REALTIME PACKET-SWITCHED | VIDEO TELEPHONE, VOIP, STREAMING AUDIO/VIDEO | SERVICE ATTEMPT BLOCKING, THROUGHPUT | E.G. 1% OF SERVICE ATTEMPTS, 25KBIT/SEC |

FIG. 3
OVERVIEW OF TRAFFIC SERVICE CLASSES
AND ASSOCIATED QoS REQUIREMENTS

| | NON REALTIME PACKET-SWITCHED | CIRCUIT-SWITCHED |
|---|---|---|
| QoS TARGET | AVG. X KBIT/SEC THROUGHPUT PER CELL (E.G. 15KBIT/SEC) | BLOCKING OF CALL ATTEMPTS PER CELL (E.G. 1% OF ALL CALLS IN CELL) |
| TRIGGER | THRESHOLD NOT MET | THRESHOLD EXCEEDED |
| OBSERVATION PERIOD | 4 DAYS OUT OF 5 DAYS | |
| TIME OF OBSERVATION | BUSY-HOUR | |

FIG. 4
QoS TARGET SETTING AND MONITORING

FLOWCHART TO EVALUATE CAPACITY UP/DOWNGRADES FOR A CELL

FLOWCHART TO EVALUATE CAPACITY UP/DOWNGRADES FOR A CELL

DEVICE AND METHOD FOR QOS BASED CELL CAPACITY DIMENSIONING

This application is a divisional application of U.S. patent application Ser. No. 10/488,551, filed on Mar. 4, 2004, which is a National Stage Application of International Patent Application No. PCT/EP01/10361, filed on Sep. 7, 2001. The disclosures of the prior applications are hereby incorporated by reference in their entirety.

FIELD AND BACKGROUND OF THE INVENTION

The invention relates to QoS (Quality of Service) based Cell Capacity Dimensioning, particularly for several Traffic Classes.

Operator networks are constantly growing in size. It is not uncommon for networks to encompass 10,000 cells (BTS). Due to the size of the network it is difficult to determine how many TRX (Transceivers) should be deployed in each cell. However, the accurate dimensioning is very important, as both over-dimensioning and under-dimensioning will have serious disadvantages. Over-dimensioning means that frequencies have to be planned for the TRX, thus putting additional constraints on the frequency planning process, which results in sub-optimal network quality. Further, costs are spent un-necessarily on purchasing and installing TRX. Under-dimensioning means that QoS targets will not be met, hence subscribers will obtain sub-standard service.

In the past only one traffic class (voice traffic) was supported in GSM networks. Thus only the QoS requirements of this voice service had to be considered when dimensioning cell capacity of cells in the network. The current method of dimensioning GSM cells is based on blocking rate of speech traffic only.

A QoS approach for the initial release of data services was 'best-effort'. I.e. packet-switched data is only being sent when voice traffic allows their transmission. This means that no QoS targets are being set for packet based services. Hence only background and non-realtime services such as FTP, downloading e-mails or web-browsing are suitable applications for this service. For any realtime application such as video telephony this QoS approach is not suitable, as the required level of capacity can not be guaranteed. With the 'best-effort' approach the actual data throughput does vary from cell to cell as the amount of spare capacity for packet-switched traffic is not the same in every cell. Moreover, with packet traffic not being uniformly distributed throughout the network certain cells will have a higher capacity demand than others. As a consequence subscribers of packet-switched services experience different QoS levels depending on the cell there are attached to. This situation is highly undesirable both for the subscriber as he does not always gets the desired level of service and for the operator as it is not possible to offer services that require QoS guarantees.

SUMMARY OF THE INVENTION

The present invention provides a method, system and device as defined in the independent claims or any one of the dependent claims.

In accordance with one aspect of the invention, a method, system, and device are provided for monitoring traffic load of at least one cell in a telecommunication system, wherein thresholds are set and monitored with regard to at least two different traffic classes, and the traffic handling capacity of the monitored cell is adapted depending on the monitoring result. The monitored traffic classes may include circuit-switched traffic and packet-switched traffic, e.g. realtime and non-realtime packet-switched traffic.

Thresholds may be set and monitored for rate of call attempt blocking, and/or data throughput, and/or service blocking.

The adaptation of traffic handling capacity of the monitored cell is preferably performed by reallocating capacity between different traffic classes. For instance, when the monitoring result indicates that at least one of the thresholds provided for at least one of the services is not met, a check may be performed as to possibility of using resources reserved for another service. When the monitoring result indicates that the threshold e.g. for circuit-switched traffic is not met, a check can be performed as to possibility of reducing the resources reserved for packet switched traffic, and, when the check result is positive, the resources reserved for packet-switched traffic are reduced. When the monitoring result should indicate that the threshold for packet-switched traffic is not met, a check can be performed as to possibility of reducing the resources reserved for circuit-switched traffic, and, when the check result is positive, the resources reserved for circuit-switched traffic are reduced, and the resources provided for packet-switched traffic are increased.

The resources reserved for packet-switched traffic may be the capacity or time slots or area of packet-switched traffic covered by a radio access network or packet-switched traffic support node. The threshold monitoring and cell capacity adaptation are preferably performed by a network management system (NMS).

The invention basically provides a method and system for automated cell capacity dimensioning for cells serving several traffic classes.

In accordance with one of preferred implementation of the invention, QoS criteria are set for each traffic class and automatically monitored. The setting and monitoring of the QoS criteria may be effected by setting and monitoring thresholds e.g. for rate of call attempt blocking, and/or data throughput, and/or service blocking.

The invention maintains good service quality not only for background and non-realtime services such as FTP, downloading e-mails or web-browsing, but also for any realtime application such as video telephony. The required level of capacity can be guaranteed. The actual data throughput can be set so as to not significantly vary from cell to cell as the amount of spare capacity for packet-switched traffic can be equalized for the cells. Moreover, even with packet traffic not being uniformly distributed throughout the network and certain cells having a higher capacity demand than others, the QoS levels experienced by subscribers of packet-switched services do not significantly differ depending on the cell they are attached to. This situation is desirable both for the subscribers as they always get the desired level of service and for the operator as it is possible to offer services with guaranteed QoS.

With the QoS monitoring of different classes, new services, e.g. (near) realtime services such as Video/Audio streaming and video telephony can be implemented which provide packet-switched QoS management. For example requests for realtime services such as streaming video/audio, video telephony and voice over IP can be treated almost like circuit-switched services. Whilst at the same time FTP and web-browsing can be satisfied with quite different, less demanding QoS requirements.

BRIEF DESCRIPTION OF THE DRAWINGS

FIG. 3 shows a table, which provides an overview of traffic service classes and associated QoS requirements, FIG. 4 shows an example of QoS target setting and monitoring.

DETAILED DESCRIPTION OF PREFERRED EMBODIMENTS OF THE INVENTION

The invention provides a method and system for automated cell capacity dimensioning for cells serving several traffic classes. Traffic classes that are currently supported in GSM are realtime (voice) and non-realtime (packet/data). The cell capacity dimensioning is based on the Quality of Service (QoS) criteria such as QoS targets for each of the different traffic classes. In the case of GSM, these QoS criteria or targets preferably are blocking rate of voice calls and throughput of data services.

For cells serving several traffic classes the traditional method of deciding on TRX upgrades will not be sufficient as it only considers the QoS requirements of the circuit-switched (voice) traffic. Hence, the invention provides a new approach for cell capacity dimensioning based on QoS requirements of different traffic classes.

A means or function that may be implemented in the method is preferably able to monitor QoS targets on a cell-by-cell basis in order to decide how much of the total cell-capacity should be dedicated to each of the traffic classes. The allocation of the available cell capacity is QoS driven and thus based on the actual level of traffic in each of the traffic class. An algorithm may be established to incorporate this method in an OSS based product for use in GSM networks.

The same method of cell dimensioning is also applicable to networks of WCDMA or other type, where the power dedicated to different services has to be dimensioned based on the QoS targets for these services.

Figure 1:
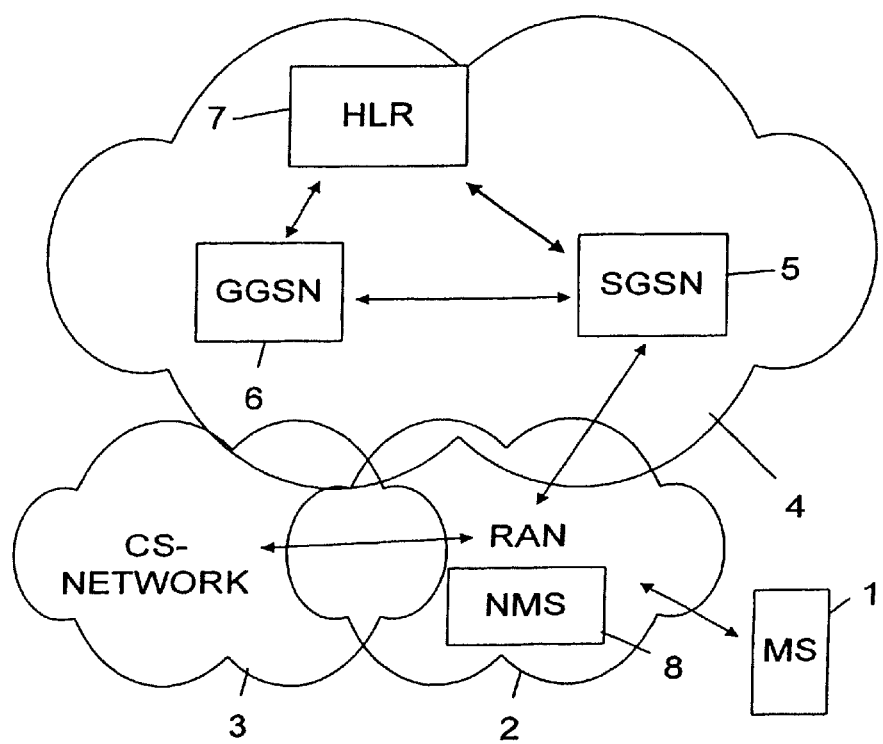
FIG. 1 illustrates a basic structure of a communication system in accordance with an embodiment of the invention.

FIG. 1 shows the system architecture of an embodiment of a communication system including several networks 2, 3, 4, e.g. a RAN (Radio Access Network) 2, a network 3 of CS (Circuit Switched) type such as a public land mobile network (PLMN) or GSM structure, and a packet-based (packet-switched PS) network 4, e.g. a GPRS (General Packet Radio Service) network or data network. A mobile or fixed user terminal 1, e.g. a GSM mobile station, is denoted as MS. In reality, a plurality of terminals 1 are provided. A connection originating from, or terminating at, one or more terminals 1 is handled by the RAN 2 and then routed to the called or originating terminal via the CS network 3 or the PS network 4.

One or more subscriber information registers such as home location register (HLR) 7 include(s) data bases available for call control and network management. In order to integrate GPRS into the GSM architecture, the GPRS System Architecture comprises GPRS support nodes (GSN) 5, 6. GSNs are responsible for the delivery and routing of data packets between the mobile stations and other terminals or networks such as external packet data networks (PDN). A Serving GPRS Support Node (SGSN) 5 is responsible for the delivery of data packets from and to the mobile stations 1 within its service area. A Gateway GPRS Support Node (GGSN) 6 acts as an interface between the GPRS backbone network and external packet data networks.

It converts the GPRS packets coming from the SGSN 5 into the appropriate packet data protocol (PDP) format (e.g., IP or X.25) and sends them out on the corresponding packet data network. In the other direction, PDP addresses of incoming data packets are converted to the GSM address of the destination user. Via appropriate interfaces, user data and signaling data are transmitted between the GSNs. All GSNs are connected via an IP-based GPRS backbone network. The HLR 7 serves as subscriber information database entity and stores the subscription-related information.

At least one or some or each of the networks 2, 3, 4 comprises a Network Management System (NMS) or operator 8.

Interfaces may connect the networks 2, 3, 4 with other public or private networks such as PDNs (e.g. Internet or corporate intranets).

With the introduction of more traffic classes into GSM such as non-realtime data services, it is also required to consider the QoS criteria or requirements of these traffic classes (such as data throughput). By considering, in accordance with embodiments of the invention, the QoS targets of both traffic classes for packet-switched and circuit-switched traffic it is possible to properly dimension the cell capacity to provide the desired level of service to all end-users regardless of their traffic class.

As the QoS provided by a cell (blocking rate and throughput) can be obtained from the Network Management System (NMS), it is possible to determine the cells which do not provide the required level of service. In these identified cells the capacity allocation will be modified. For example when the data traffic is increasing with time more capacity has to be allocated to this service class. As this increase is not uniform across the network, it is preferred to use different capacity allocation in every cell.

By automating the process of monitoring the QoS targets and changing to the current capacity allocation on the cell, the operator or NMS 8 will be offered a method that enables auto-dimensioning of all cells in the network based on the traffic in each traffic class.

For cellular systems that support several different traffic classes, such as in WCDMA, the cell capacity will be dimensioned based on the QoS targets of all different classes that are being supported.

An apparatus configured to monitor Quality of Service, QoS, criteria of at least two different traffic classes in at least one cell in a telecommunication system. The apparatus includes monitoring means or the processor configured to monitor an actual call blocking rate and data through-put, comparing means or the processor configured to compare the actual call blocking rate with a blocking rate threshold and the data through-put with a data through-put threshold and output monitoring results indicative thereof. The apparatus also includes adapting means or the processor configured to adapt the traffic handling capacity of the monitored cell by reallocating capacity between the different traffic classes depending on the monitoring results. The apparatus further includes providing means or the processor configured to provide a forecasting functionality to estimate a time point to perform a next upgrade of hardware capacity to handle the traffic to ensure sufficient and appropriate future traffic handling capacity. The forecasting functionality is configured to perform an evaluation of time changes or time behavior of parameters indicating traffic or traffic growth, successively detect an actual value of the parameters in repeatedly executed steps, and determine, on the basis of the time changes or the time behavior, the time point when the traffic handling capacity of the communication system is to reach an upper limit with respect to the QoS criteria. The forecasting functionality is also configured signal or display the determined time point for planning a next upgrade of hardware capacity for handling the traffic to ensure sufficient and appropriate future traffic handling capacity.

Figure 2:
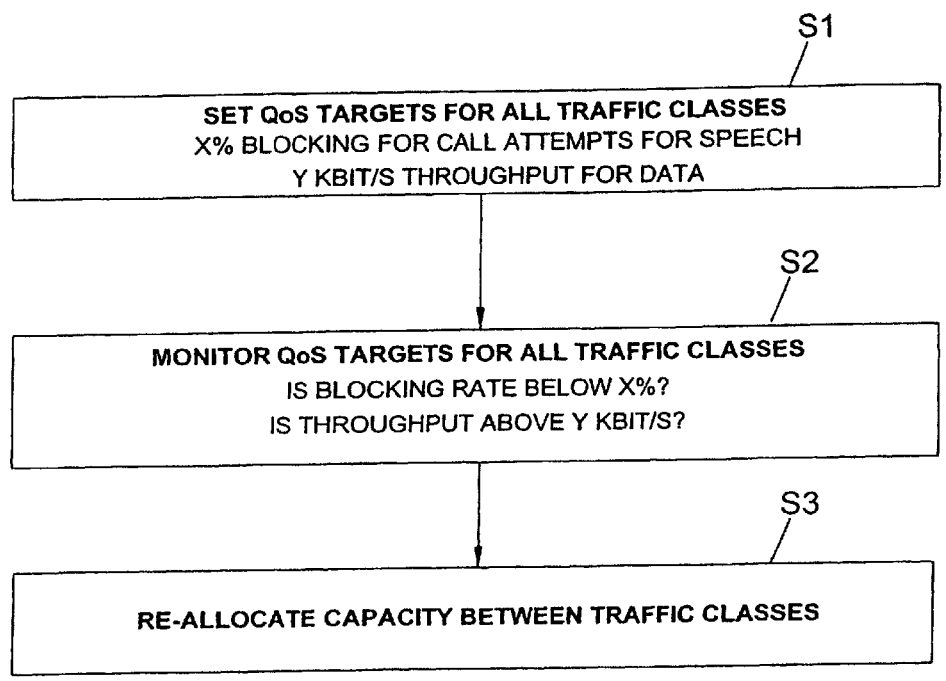
FIG. 2 shows a basic flowchart for cell capacity dimensioning based on QoS targets.

FIG. 2 illustrates a highlevel overview of an embodiment of a method and system in accordance with the present invention. FIG. 2 is a basic flowchart for Cell Capacity Dimensioning based on QoS Targets.

FIG. 2 provides a general overview of the steps involved in cell capacity dimensioning based on QoS for several traffic classes. For clarity only two traffic classes (voice and data) are being considered. Of course, more than two classes can be monitored in embodiments of the invention.

As shown in FIG. 2, a first step S1 in this process is the setting of the QoS targets. In the case of ordinary speech traffic, this is the call blocking rate. For non-realtime packet-switched data traffic this is the (minimum) throughput that has to be provided to users. For each traffic class that is supported a QoS criteria has to be set, i.e. 2% allowable blocking rate and 15 kbit/s minimum data throughput.

Subsequently these QoS targets are monitored to check whether the required QoS targets are provided in each cell. For voice traffic the set maximum blocking rate has to be checked against the actual blocking rate. And the actual data throughput has to be compared against the set data throughput. This task is represented by the second step S2 in FIG. 2.

If the blocking rate target is e.g. 2%, all cells in the network will be listed that exceed this threshold. When a cell has exceeded this blocking threshold for e.g. four days in a row, the trigger condition is met and a capacity allocation or increase for this cell will be suggested, e.g. a TRX upgrade, i.e. an addition of an additional TRX to the cell. This capacity allocation or increase ensures that the desired level of QoS (e.g. call blocking rate) is provided. Once it has been established, in step S2, in which cell a certain QoS target is not met, the current capacity allocation has to be modified as represented by step S3. For example if the blocking rate is above the set threshold, more capacity has to be dedicated to circuit-switched (CS) services (provided the QoS target of the data traffic can still be met). Alternatively the capacity dedicated to circuit-switched traffic might be reduced in favour of the packet-switched (PS) service if the throughput targets are not being met.

Note that step S1 has to be executed only once for the network, whereas steps S2 and S3 have to be continuously or repeatedly carried out for each cell in the network. This means that the whole process has to be automated to be efficient.

If other traffic classes are introduced into the system such as realtime and non-realtime data services, then the method has to be modified to include the QoS requirements of all traffic classes. But the principle of including the QoS from all supported traffic classes is still applicable.

Generally, the present invention provides a cell capacity dimensioning based on QoS requirements for multiple traffic classes, and covers several technologies (GSM, WCDMA, etc) and any traffic class. In some of the embodiments, the invention is directed to certain radio access technology (GSM or WCDMA) and to certain traffic classes (voice, realtime data, non-realtime data, etc).

The following sections provide more information on the method and system according to embodiments of the invention, with a focus on GSM networks serving as example. Some basic facts and benefits for an automated system for capacity dimensioning are outlined below.

The proposed method offers great flexibility to the operator. For example it is possible to set, as one of the QoS targets, a different call blocking threshold or different number of days for which the threshold has to be violated before a new TRX is taken into use. In addition in this scenario it is also possible to automate the detection of blocking cells via NMS based scripts. Hence methods and tools are available to operator for carrying out capacity planning on a cell-by-cell basis.

The embodiments of the invention are able to cope with the convergence of mobile networks and the internet, and the increasing packet-switched traffic in cellular networks. Services such as Video/Audio streaming and video telephony, i.e. (near) realtime services providing packet-switched QoS management can be managed by adapting the offered cell capacity to the demand. For example requests for realtime services such as streaming video/audio, video telephony and voice over IP can be treated almost like circuit-switched services. Whilst at the same time FTP and web-browsing can be covered with quite different, less demanding QoS requirements.

FIG. 3 shows an overview of Traffic Service Classes and associated QoS Requirements. The table of FIG. 3 shows examples of different traffic and their respective QoS requirements. Voice traffic is shown as an example of circuit-switched traffic class. For this traffic class the blocking of call attempts is the QoS criteria and 2% might be selected. Additionally FIG. 3 provides similar information for realtime and non-realtime packet-switched traffic. The traffic classes shown in FIG. 3 are just examples of the traffic classes that operators might support in cellular networks and their QoS criteria.

In more detail, the table of FIG. 3 indicates, in its left-hand column, Traffic Classes (left column) such as circuit-switched (CS), non-realtime packet-switched (NRT-PS), and realtime packet-switched (RT-PS). The second column contains Traffic Examples for the traffic classes, e.g. voice traffic for CS; FTP, e-mail download, web-browsing for NRT-PS; and video telephone, VoIP, streaming audio/video for RT-PS. The third column defines QoS criteria examples such as call attempt blocking for CS; Throughput for NRT-PS; and service attempt blocking, throughput for RT-PS. The fourth column indicates examples for QoS Requirements, i.e. maximum thresholds, e.g. 2% of all call attempts for CS; 15 kbit/sec for NRT-PS; and 1% of service attempts, 25 kbit/sec for RT-PS.

The following section describes an embodiment of a detailed algorithm for GSM with two traffic classes, i.e. speech and data. The section explains how the cell capacity can be determined based on the QoS requirements of several traffic classes. Firstly a highlevel overview is being provided to outline the method. Then a more detailed description is being provided for an example of two traffic classes.

The disclosed method aims to dimension the capacity that is required on a cell level, i.e. the number of TRX in the cell that are required to carry the traffic load in the different traffic classes with appropriate quality. This method does not aim to guarantee QoS on a connection basis.

In this section an example of two traffic classes is being presented to illustrate the method in more detail. The traffic classes considered are circuit-switched speech and packet-switched (non-realtime) data traffic. The example uses existing GPRS terminology to illustrate the principle.

According to the flowchart presented in FIG. 2, the first step S1 is the setting of the QoS targets.

FIG. 4 shows examples of the QoS target setting and monitoring of values set for the QoS targets. For NRT-PS, i.e. for data services, a throughput rate of e.g. 15 kbit/sec is assumed as the minimum level, i.e. the QoS Target is set to an average 15 kbit/sec throughput per cell. For CS traffic (speech) a call-attempt blocking rate of 1% is being assumed as the maximum level, i.e. the QoS target "Blocking of call attempts per cell" is set to "1% of all calls in cell". The triggers for starting a redimensioning of the cell capacity are set for NRT-PS "Threshold not met". For CS, the trigger is "Threshold Exceeded".

In addition to these targets also the time of the observation and the observation period are being listed. Both of these criteria are related to the monitoring of the QoS, which is the second step S2 in the highlevel plan presented in FIG. 2. The observation period is set e.g. to "4 days out of 5 days". The "Time of Observation" may also be set, e.g. to "Busy-Hour", so as to eliminate influences of operation times normally not requiring high cell capacity such as midnight hours. Such influences would change the average values of the observation period and might simulate sufficient average cell capacity despite capacity lack during busy hours.

Figure 5:
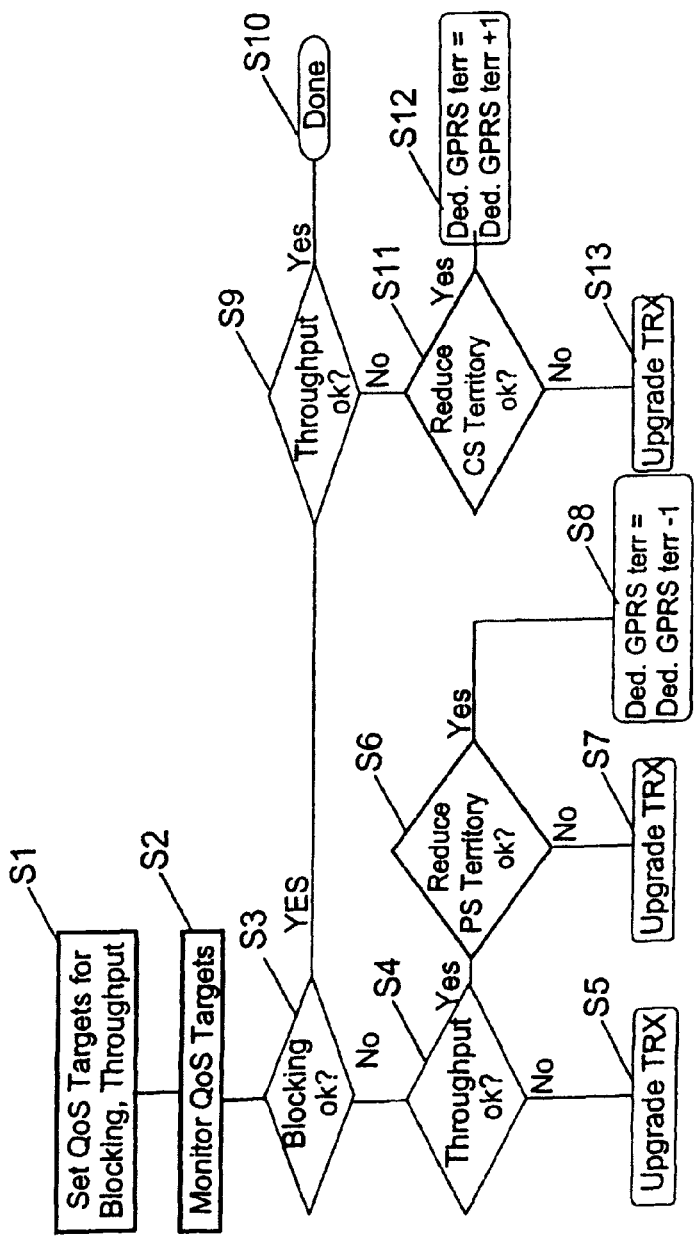
FIG. 5 is a flowchart of an embodiment according to the invention of a method for evaluating capacity up/downgrades for a cell.

FIG. 5 shows a flowchart of a method in accordance with the invention. The diagram illustrates the evaluation of Capacity Up/Downgrades for a cell and possible Cell Capacity Re-allocation.

FIG. 5 displays the logic of deciding on capacity up/downgrades for a certain service. Steps S1, S2 of FIG. 5 correspond to the steps S1, S2 shown in FIG. 2. In step S3, the blocking rate is checked and compared to the set QoS threshold. In steps S4, S9, the throughput rate is checked and compared to the set QoS threshold. Steps S6, S11 perform a check whether a reduction of the PS/CS territory/capacity is possible while still maintaining sufficient quality. In steps S5, S7, S13, the transceiver capacity is increased. Step S10 indicates the end of a check routine. In steps S8, S11, the dedicated GPRS territory/capacity is decreased/increased.

If for a certain cell the blocking levels are okay and the throughput is also okay, then it is not required to take any further action. This case is denoted by steps S3, S9, S10. However, if either of these criteria is not met, then it has to be decided if re-arranging of the existing capacity allocation can alleviate the QoS problem.

For example if the blocking (checked in step S3) is okay, i.e. not above the set value, but the throughput (checked in step S9) is not okay, then it has to be decided (in step S11) if the circuit-switched capacity/territory can be reduced without causing any problems in the speech traffic. If this is possible (answer Yes of step S11), more capacity is dedicated to the packet-switched traffic (step S12; Dedicated GPRS Territory is incremented by a certain value, e.g. "1") so as to meet the QoS targets of both services. This re-allocation essentially is a reallocation of CS capacity to PS capacity without increasing the overall cell capacity.

If the re-allocation of capacity would lead to a violation or undue impairing of the circuit-switched traffic (answer NO of step S11) then step S13 "Upgrade TRX" is carried out and the cell capacity is increased, e.g. by adding a new transceiver TRX to the cell.

Alternatively if the blocking is not okay (answer NO of step S3) but the result of throughput check, step S4, is ok (answer YES of step S4), then it might be possible to reduce (step S6) the capacity or territory for the packet-switched traffic. If possible, step S8 is carried out so as to reduce the packet-switched territory. If not possible, step S7 is executed so as to increase the call handling capacity of the cell e.g. by adding a transceiver TRX.

If both blocking and throughput are not okay then the cell capacity is increased in step S5 e.g. by adding a TRX, as both services require their current capacity allocation.

Figure 6:
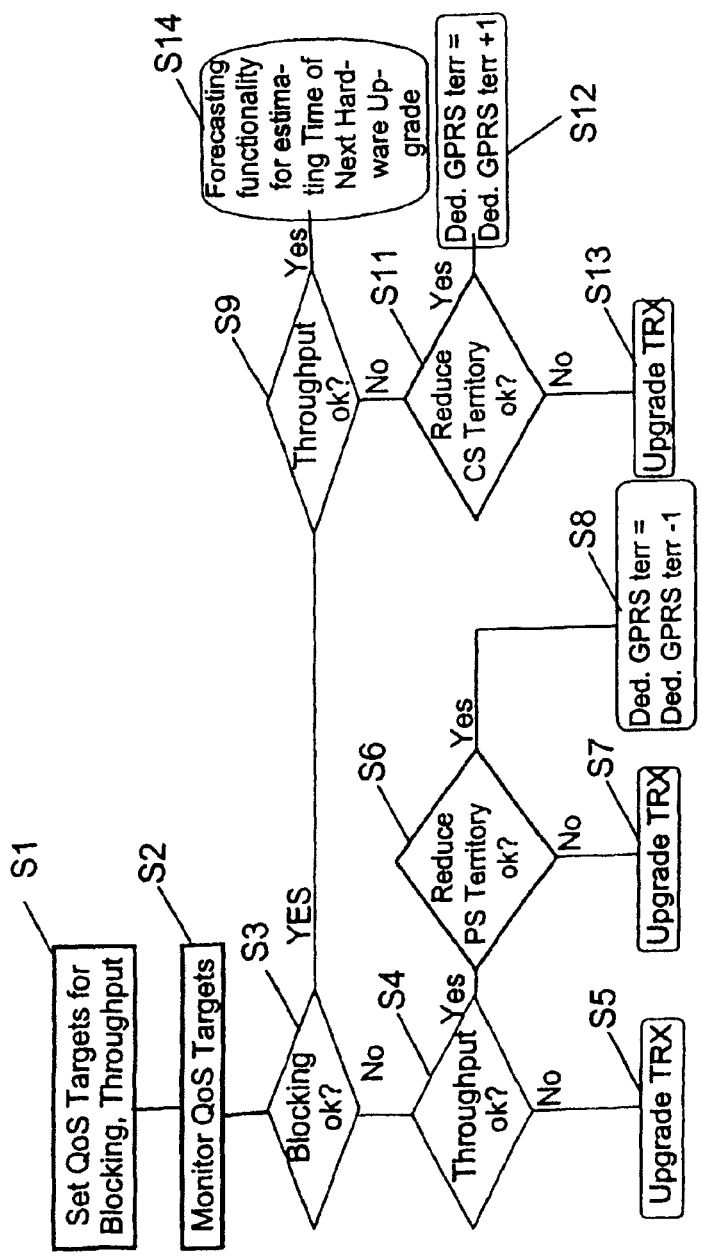
FIG. 6 is a flowchart of a further embodiment according to the invention of a method for evaluating capacity up/downgrades for a cell.

FIG. 6 shows a further embodiment of the invention which is identical to the above described embodiment of FIG. 5 as regards steps S1 to S9, and S11 to S13. Step S10 (DONE) of FIG. 5 has been replaced by a step S14 "Forecasting functionality for estimating Time of Next Hard-ware Up-grade". This forecasting functionality of step S14 indicates when an additional TRX/BTS will be required due to traffic growth in that cell.

In step S14, an evaluation of the time changes or time behaviour of parameters indicating the traffic or traffic growth is performed for estimating the time point when an upgrade of the hardware capacity handling the traffic will become necessary for ensuring sufficient and appropriate future traffic handling capacity.

As an example, in step S14, the QoS target values successively detected in repeatedly executed step S2 are transmitted to a means performing step S14 and processed, e.g. stored therein. The time behaviour, e.g. growing rate, of the detected QoS values is then processed in step S14 so as to estimate the time when the traffic handling capacity of the network, e.g. RAN, will reach its upper limit. The reaching of this upper limit requires network management and operation service actions, e.g. the addition of new hardware, e.g. a new BTS or additional processing component, to the system for subsequently ensuring sufficient QoS quality. The estimated time of reaching the upper limit, i.e. of hardware update will be signalled or displayed to the operator so as to inform the operator on the estimated update time point.

As an alternative, the actual blocking rate, or the deviations of the actual blocking rate from the allowable blocking rate, as detected in step S3, and/or the actual throughput rate, or the deviations of the actual throughput rate from the allowable throughput rate, as detected in step S9, can be transmitted to the means performing step S14. This means detects the time behaviour, preferably the rate of change, of the rates or deviations, and deduces therefrom the estimated time point when the provided QoS will be lowered to a minimum acceptable value. The estimated time point is displayed or signalled or otherwise brought to the attention of the operator for planning future hardware update actions.

In actual networks it may be required to consider more than two traffic classes as presented in this example. As shown in FIG. 3, realtime packet-switched services may also have to be considered. In addition further QoS criteria may have to be added once new traffic classes are being added as services to the network.

In particular when the GPRS traffic makes up a significant part of the cell traffic (GPRS and speech traffic), it is advantageous to consider QoS of both packet and circuit switched traffic (throughput and blocking, respectively) for cell dimensioning. In addition to TRX upgrades also re-allocation of territory is able to provide the desired QoS. So dimensioning the cell correctly is more difficult as more degrees of freedom (number of TRX and size of territory) have to be considered.

The major advantage provided by the disclosed method is the fact that cell dimensioning can be automated so that operators do not require additional staff for the cell dimensioning. Otherwise, due to the size of the network (10000 cells not un-common) the task of cell dimensioning for packet and circuit switched traffic would be extremely cumbersome to manage.

In embodiments, the NMS may provide reports that show QoS data (blocking and throughput) for each cell. This method may be completely implemented in the NMS.

A computer program embodied on a non-transitory computer readable medium to monitor Quality of Service, QoS, criteria of at least two different traffic classes in at least one cell in a telecommunication system. The computer program is configured to control a processor to perform monitoring and comparing an actual call blocking rate with a blocking rate threshold and data through-put with a data through-put threshold and outputting monitoring results indicative thereof, and adapting traffic handling capacity of the monitored cell by reallocating capacity between the different traffic classes depending on the monitoring results. The forecasting functionality includes performing an evaluation of time changes or time behavior of parameters indicating traffic or traffic growth, and successively detecting an actual value of the parameters in repeatedly executed steps. The forecasting functionality also includes determining, on the basis of the time changes or the time behavior, a time point when the traffic handling capacity of the communication system is to reach an upper limit with respect to the QoS criteria. The forecasting functionality further includes signaling or displaying the determined time point for planning a next upgrade of hardware capacity for handling the traffic to ensure sufficient and appropriate future traffic handling capacity.

Although the invention has been described above with reference to specific embodiments, the scope of the invention also covers any alterations, additions, modifications, and omissions of the disclosed features.

The invention claimed is:

1. A method to monitor Quality of Service, QoS, criteria of at least two different traffic classes in at least one cell in a telecommunication system, comprising:
    monitoring and comparing an actual call blocking rate with a blocking rate threshold and data through-put with a data through-put threshold and outputting monitoring results indicative thereof;
    upon detecting a negative monitoring result, adapting traffic handling capacity of the monitored cell by reallocating capacity between the different traffic classes; and
    providing a forecasting functionality comprising
        performing an evaluation of time changes or time behavior of parameters indicating traffic or traffic growth,
        successively detecting an actual value of the parameters in repeatedly executed steps,
        determining, on the basis of the time changes or the time behavior, a time point when the traffic handling capacity of the communication system is to reach an upper limit with respect to the QoS criteria, and
        signaling or displaying the determined time point for planning a next upgrade of hardware capacity for handling the traffic to ensure sufficient and appropriate future traffic handling capacity.

2. The method according to claim 1, wherein the forecasting functionality indicates when an additional transmitter or base transceiver station, BTS, is required due to traffic growth in the cell.

3. The method according to claim 1, wherein the monitored traffic classes include circuit-switched traffic and packet-switched traffic.

4. The method according to claim 3, wherein, when the monitoring results indicate that the threshold for the circuit-switched traffic is not met the method further comprises
    determining whether to reduce the resources reserved for the packet switched traffic, and, when the determination is positive, reducing the resources reserved for the packet-switched traffic.

5. The method according to claim 3, wherein, when the monitoring results indicate that the threshold for the packet-switched traffic is not met, the method further comprises
    determining whether to reduce the resources reserved for the circuit-switched traffic, and, when the determination is positive, reducing the resources reserved for the circuit-switched traffic, and increasing the resources provided for the packet-switched traffic.

6. The method according to claim 3, wherein the resources reserved for the packet-switched traffic are capacity or time slots or the area of the packet-switched traffic covered by a radio access network or packet-switched traffic support node.

7. The method according to claim 1, wherein the monitored traffic classes include realtime and non-realtime packet-switched traffic.

8. The method according to claim 1, wherein QoS criteria thresholds are set for each traffic class and monitored automatically.

9. The method according to claim 1, wherein, when the monitoring results indicates that at least one of the thresholds provided for at least one of the traffic classes is not met, the method further comprises
    determining whether to change resources reserved for another traffic class.

10. The method according to claim 1, wherein the threshold monitoring and cell capacity adaptation are performed by a network management system (NMS).

11. The method according to claim 1, wherein the traffic handling capacity of the monitored cell is adapted by reallocating capacity between different traffic classes, depending on the monitoring results, so as to avoid violation of the thresholds.

12. An apparatus configured to monitor Quality of Service, QoS, criteria of at least two different traffic classes in at least one cell in a telecommunication system, comprising:
    a processor configured to
        monitor an actual call blocking rate and data through-put,
        compare the actual call blocking rate with a blocking rate threshold and the data through-put with a data through-put threshold and output monitoring results indicative thereof,
        upon detecting a negative monitoring result, adapt traffic handling capacity of the monitored cell by reallocating capacity between the different traffic classes, and
        provide a forecasting functionality to estimate a time point to perform a next upgrade of hardware capacity to handle the traffic to ensure sufficient and appropriate future traffic handling capacity, wherein the forecasting functionality is configured to
            perform an evaluation of time changes or time behavior of parameters indicating traffic or traffic growth,
            successively detect an actual value of the parameters in repeatedly executed steps,
            determine, on the basis of the time changes or the time behavior, the time point when the traffic handling capacity of the communication system is to reach an upper limit with respect to the QoS criteria, and
            signal or display the determined time point for planning a next upgrade of hardware capacity for handling the traffic to ensure sufficient and appropriate future traffic handling capacity.

13. The apparatus according to claim 12, wherein the apparatus implemented as or in a network management system (NMS).

14. The apparatus according to claim 12, wherein the forecasting functionality is further configured to indicate when an additional transmitter or base transceiver station, BTS, will be required due to traffic growth in the cell.

15. The apparatus according to claim 12, wherein the monitored traffic classes include circuit-switched traffic and packet-switched traffic.

16. The apparatus according to claim 15, wherein the processor is further configured to, when the monitoring results indicate that the threshold for the circuit-switched traffic is not met, determine whether to reduce the resources reserved for the packet switched traffic, and, when the check result is positive, reduce the resources reserved for the packet-switched traffic.

17. The apparatus according to claim 15, wherein the processor is further configured to, when the monitoring results indicate that the threshold for the packet-switched traffic is not met,
determine whether to reduce the resources reserved for the circuit-switched traffic, and when the check result is positive, reduce the resources reserved for the circuit-switched traffic, and increase the resources provided for the packet-switched traffic.

18. The apparatus according to claim 15, wherein the resources reserved for the packet-switched traffic are capacity or time slots or the area of the packet-switched traffic covered by a radio access network or packet-switched traffic support node.

19. The apparatus according to claim 12, wherein the monitored traffic classes include realtime and non-realtime packet-switched traffic.

20. The apparatus according to claim 12, wherein QoS criteria thresholds are set for each traffic class.

21. The apparatus according to claim 12, wherein the processor is further configured to, when the monitoring results indicate that at least one of the thresholds provided for at least one of the traffic classes is not met, determine whether to change the resources reserved for another traffic class.

22. The apparatus according to claim 12, wherein the processor is further configured to adapt the traffic handling capacity of the monitored cell to reallocate capacity between different traffic classes depending on the monitoring results, so as to avoid violation of the thresholds.

23. A computer program embodied on a non-transitory computer readable medium to monitor Quality of Service, QoS, criteria of at least two different traffic classes in at least one cell in a telecommunication system, the computer program being configured to control a processor to perform:
monitoring and comparing an actual call blocking rate with a blocking rate threshold and data through-put with a data through-put threshold and outputting monitoring results indicative thereof;
upon detecting a negative monitoring result, adapting traffic handling capacity of the monitored cell by reallocating capacity between the different traffic classes; and
providing a forecasting functionality comprising
performing an evaluation of time changes or time behavior of parameters indicating traffic or traffic growth,
successively detecting an actual value of the parameters in repeatedly executed steps,
determining, on the basis of the time changes or the time behavior, a time point when the traffic handling capacity of the communication system is to reach an upper limit with respect to the QoS criteria, and
signaling or displaying the determined time point for planning a next upgrade of hardware capacity for handling the traffic to ensure sufficient and appropriate future traffic handling capacity.

24. An apparatus for monitoring Quality of Service, QoS, criteria of at least two different traffic classes in at least one cell in a telecommunication system, comprising:
monitoring means for monitoring an actual call blocking rate and data through-put,
comparing means for comparing compare the actual call blocking rate with a blocking rate threshold and the data through-put with a data through-put threshold and output monitoring results indicative thereof,
adapting means for adapting, upon detecting a negative monitoring result, the traffic handling capacity of the monitored cell by reallocating capacity between the different traffic classes, and
providing means for providing a forecasting functionality for estimating a time point to perform a next upgrade of hardware capacity to handle the traffic ensuring sufficient and appropriate future traffic handling capacity, wherein the forecasting functionality
performs an evaluation of time changes or time behavior of parameters indicating traffic or traffic growth,
successively detects an actual value of the parameters in repeatedly executed steps,
determines, on the basis of the time changes or the time behavior, the time point when the traffic handling capacity of the communication system is to reach an upper limit with respect to the QoS criteria, and
signals or displays the determined time point for planning a next upgrade of hardware capacity for handling the traffic to ensure sufficient and appropriate future traffic handling capacity.

\* \* \* \* \*